(12) United States Patent
Herman

(10) Patent No.: US 10,074,062 B2
(45) Date of Patent: Sep. 11, 2018

(54) NAPKIN IDEA SYSTEMS

(71) Applicant: Jeffrey Robert Herman, Scottsdale, AZ (US)

(72) Inventor: Jeffrey Robert Herman, Scottsdale, AZ (US)

( * ) Notice: Subject to any disclaimer, the term of this patent is extended or adjusted under 35 U.S.C. 154(b) by 0 days.

(21) Appl. No.: 15/345,080

(22) Filed: Nov. 7, 2016

(65) Prior Publication Data

US 2017/0132442 A1    May 11, 2017

Related U.S. Application Data

(60) Provisional application No. 62/252,451, filed on Nov. 7, 2015.

(51) Int. Cl.
*G06F 17/00* (2006.01)
*G06Q 10/08* (2012.01)

(52) U.S. Cl.
CPC .................. *G06Q 10/083* (2013.01)

(58) Field of Classification Search
USPC ............................................ 235/375, 462.01
See application file for complete search history.

(56) References Cited

U.S. PATENT DOCUMENTS

| | | | |
|---|---|---|---|
| 4,378,391 A | 3/1983 | Allen | |
| 6,928,929 B1* | 8/2005 | McNeil | B26D 5/32 101/226 |
| 9,186,284 B1* | 11/2015 | Hernandez | A61F 13/55145 |
| 2001/0030226 A1* | 10/2001 | Guest | B65D 27/16 229/80 |
| 2005/0082198 A1* | 4/2005 | Batis | B42D 1/08 206/575 |
| 2005/0091887 A1 | 5/2005 | Jones | |
| 2006/0032896 A1* | 2/2006 | Bethke | B42D 5/026 229/92.3 |
| 2006/0229940 A1* | 10/2006 | Grossman | G06Q 10/08 705/14.31 |
| 2007/0124895 A1* | 6/2007 | Brown | A47B 96/00 24/16 PB |
| 2010/0213699 A1* | 8/2010 | Tremper | A47G 11/001 283/117 |
| 2010/0264591 A1* | 10/2010 | Hutchison | A47G 11/001 273/287 |
| 2011/0129805 A1 | 6/2011 | Bolt | |
| 2013/0024253 A1* | 1/2013 | Silverman | G09F 23/12 705/14.4 |
| 2013/0052432 A1* | 2/2013 | Koebel | A61F 13/15 428/195.1 |
| 2016/0027082 A1* | 1/2016 | Noyes | G06Q 30/02 705/26.5 |

* cited by examiner

*Primary Examiner* — Tuyen K Vo
(74) *Attorney, Agent, or Firm* — Enrique A. Monteagudo

(57) ABSTRACT

A napkin useful for enabling a user to document a new idea by providing a clear open writing space, indicia inviting the secure sharing of the new idea, and a means for communicating the new idea in real-time using modern communication technology to a third party having means to assist the user with their idea. Accompanying the napkin is a holder for retaining napkins, writing instruments, and instructions for using the napkin. A business method for using the napkins to promote businesses in the invention industry is also disclosed.

16 Claims, 6 Drawing Sheets

NAPKIN IDEA SYSTEMS

CROSS-REFERENCE TO RELATED APPLICATION

The present application is related to and claims priority from prior provisional application Ser. No. 62/252,451, filed Nov. 7, 2015 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of napkins and more specifically relates to a napkin having a writeable surface and useful for providing entertainment.

2. Description of Related Art

Napkins are regularly used in restaurants, bars, lounges, cafes, and other dining establishments. Napkins are useful as a place setting for silverware, for patron use while eating and drinking, for cleaning up spills and messes, and the like.

Many people come up with new thoughts while they are eating or drinking and conversing with friends, family, acquaintances, and even strangers. Sometimes, a person might wish to write down a quick idea. However, some napkins are too thin and easily tear when writing on them, and other napkins are difficult to write on because of the napkin paper quality.

Several attempts have been made to solve the above-mentioned problems such as those found in U.S. Pub. No. 20050091887 to R. Jones and Gary Klembara. This art is representative of folding annotation device. The folding annotation device is a folding device composed of a disposable paper product, and includes a number of panels connected to each other via shared folding junctions. At least some of these panels include preprinted content, some of which includes indications for new content to be written responsively to the preprinted content in corresponding blank spaces. However, none of the above inventions and patents, taken either singly or in combination, is seen to describe the invention as claimed.

Preferably, a napkin for writing should provide a clear, open writing space and be manufactured at a modest expense. Thus, a need exists for napkin idea systems to avoid the above-mentioned problems.

BRIEF SUMMARY OF THE INVENTION

In view of the foregoing disadvantages inherent in the known napkin art, the present invention provides a novel napkin idea system. The general purpose of the present invention, which will be described subsequently in greater detail is to provide a napkin useful for allowing a user to document a new idea by providing a clear, open writing space and a submission-means for communicating the new idea using an internet-enabled mobile device to a third party for assessment purposes.

As will be described in further detail, the present invention may essentially comprise a napkin and accompanying accessories designed for enabling users eating or drinking at dining establishments such as bars, restaurants, lounges, and the like to conveniently be able to jot down an idea, a concept, or some other inventive or original thought using text, sketches, doodles, and the like, and then to be able to transmit their idea via a website or mobile application that may be readily accessible on a mobile device of the user for third party evaluation, and to spark creative conversation and provide entertainment to patrons of the dining establishment.

In an embodiment of the present invention, napkin idea systems may comprise a stylized napkin having a writeable surface, indicia printed on the napkin, the indicia configured for inducing a user to scribble an idea on the writeable surface of the napkin, and a submittal-means configured to enable the user to remotely submit the idea to a third-party for evaluation of the idea.

The submittal-means may be transmittable via a website hosted on a server and accessible via an Internet connection and alternatively a downloadable mobile application program accessible via a mobile device. The website or the downloadable mobile application program may comprise a file uploader configured to enable the user to submit a digital image of the idea captured by said user. The website or downloadable mobile application program further may comprise a plurality of form fields configured to enable the user to submit data, and the third-party is able to receive the idea for purposes of evaluating the concept for the new invention.

Napkin idea systems may take the form of a kit. The kit may include a stock of napkins having the writeable surface and the indicia printed on the napkins configured for inducing the user-patron to scribble an idea on the writeable surface of the napkin, at least one pen optimized for writing on the writeable surface of the napkin, and at least one napkin holder for retaining the pens and a stack of napkins. The napkin may depict instructions for using napkin idea systems for promoting inventive concepts.

A business method for using napkin idea systems by a third-party in the business of working with inventive concepts may comprise the steps of: (1) contracting with at least one public establishment (ie. bar, restaurant, cafe, etc.) to supply a stock of napkins having the writeable surface and indicia printed on the napkin configured for inducing user-patrons to scribble their ideas on the writeable surface of the napkin; (2) delivering the stock of napkins and optionally delivering accompanying napkin accessories (pens and napkin holders) to the public establishment; (3) receiving napkin idea submission(s) from user-patron(s) electronically via the different submittal-means; and (4) offering an assessment service to the user-patron(s) to investigate the napkin idea submission(s) further on at least one professional level.

Optional steps may include: rewarding the user-patron for submitting a napkin idea submission; and sorting the napkin idea submission(s) on a preliminary level prior to contacting user-patron.

Professional services a third-party may offer the user-patron may include, but not limited to, patentability assessment, intellectual property protection, marketability assessment, commercial viability assessment, prototype development, program development, or licensing assistance of intellectual property.

The present invention holds significant improvements and serves as a napkin idea system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, napkin idea systems, constructed and operative according to the teachings of the present invention.

The various embodiments of the present invention will hereinafter be described in conjunction with the appended drawings, wherein like designations denote like elements.

DETAILED DESCRIPTION

Figure 1:
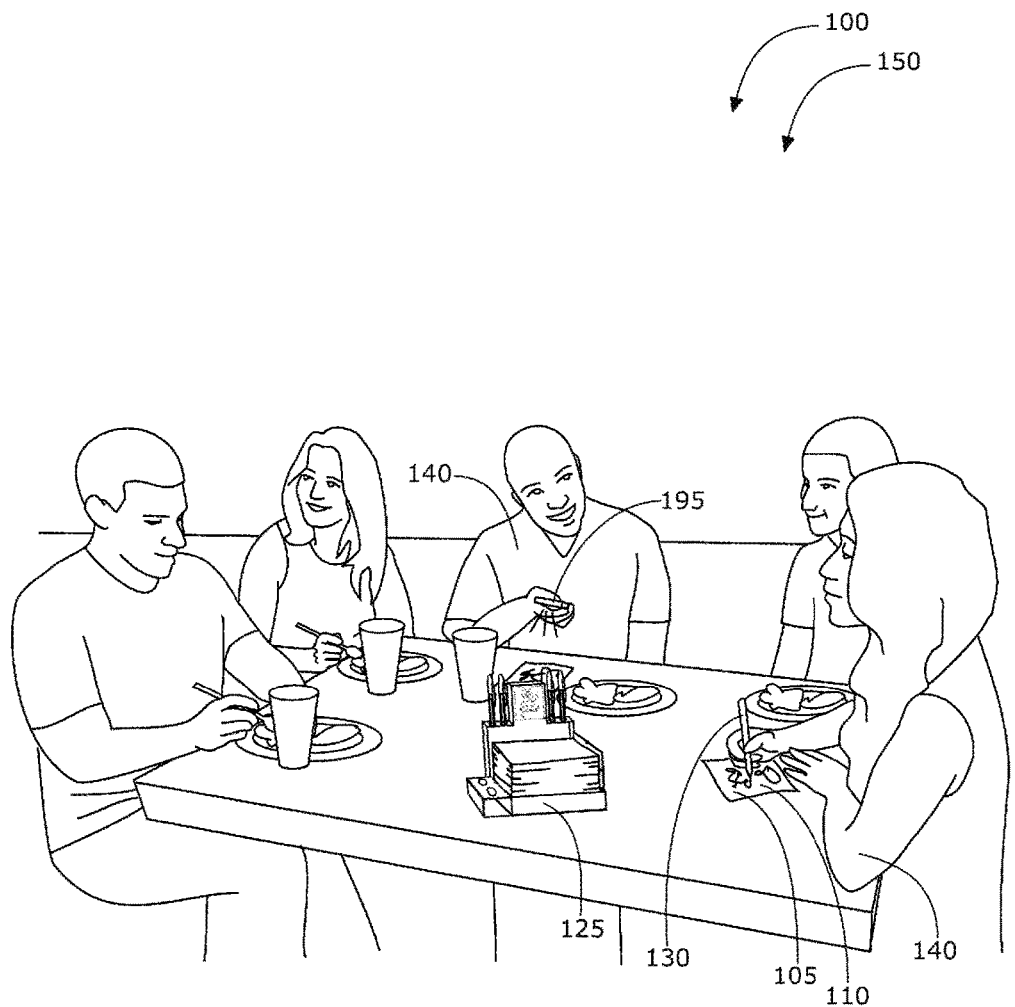
FIG. 1 shows a perspective view illustrating napkin of napkin idea systems during an 'in-use' condition showing a user-patron scribbling an idea on a writeable surface of the napkin according to an embodiment of the present invention.

As discussed above, embodiments of the present invention relate to a napkin and more particularly to napkin idea systems useful for allowing a user to document a new idea by providing a clear, open writing space and a means for communicating the new idea using modern communication technology to a third party having means to assist the user with the new idea.

Generally speaking, napkin idea systems is a napkin concept designed to enable a user to be able to jot down an idea, a concept, or some other inventive or original thought using text, sketches, doodles, and the like, and then to be able to transmit their idea via a website or mobile application that may be readily accessible on a mobile device of the user for third party evaluation and to spark creative conversation and provide entertainment to patrons of the dining establishment. The present invention provides a means for inducing innovative thought and resulting in business for patent companies and other companies in the invention industry.

The napkin, as shown, is able to function as a conventional napkin for ordinary use during times of eating and drinking. Such use traditionally includes use as a silverware setting, use as a plate setting, use to wipe hands, face, and mouth while eating and drinking, use for cleaning up spills, use as a coaster for a drink to prevent condensation rings from forming on a table, use as a garment protector, use for holding hot and cold dishes and cups/glasses, and the like.

Napkin idea systems, AKA Napkin Ideas®, may preferably comprise a square-shaped cocktail napkin comprising for example the following indicia: (1) a logo in the form of a pencil having a light bulb where the eraser normally would be, the light bulb comprising a face; (2) a website URL linked to a website designed and arranged to accept a user submission; (3) at least one scan, bar, or QR code also linked to the website designed and arranged to accept the user submission; (4) empty space for writing, scribbling, and doodling by the user-patron; and (5) room for other indicia (such as images, text, branding, logos, or the like).

The napkin may preferably be fabricated of strong ply napkin paper useful for clearly receiving ink or graphite from a writing instrument with minimal difficulty. In a preferred embodiment, the napkin material is fabricated of 3-ply napkin paper. The strong ply napkin comprises greater absorption strength for controlling bleeding of ink or graphite into napkin paper beneath the top writing surface. Further, the strong ply napkin material is useful for absorbing spills, condensation, and other liquid and food matter while dining and cleaning.

In other embodiments, it should be noted that the napkin may comprise other rectangular dimensions, and non-rectangular dimensions, based on user-patron or dining establishment preference. In other embodiments, Napkin Ideas may be in the form of a coaster. The coaster may be fabricated of sturdy hard card board and may be essentially useful for providing a table buffer between a table and a beverage container and as a writing surface bearing the indicia described herein for sparking new original thought(s) and a writing surface for receiving the original thought(s) via a writing instrument. The coaster may further comprise a lip for reducing condensation drip from a diameter/edge of the coaster.

As may be appreciated, a user-patron may write, jot, annotate, scribble, and otherwise write on the front surface (and any other surface) of the cocktail napkin using a writing instrument. A stock of writing instruments best suitable for use with the cocktail napkins may be provided to the bar restaurant. Writing instruments may further comprise indicia inducing creativity and ingenuity. Further, writing instruments may comprise branding indicia complementary to Napkin Ideas and any third-parties in receipt of confidential idea information as generated by user-patrons.

Further, napkin idea systems may comprise a kit including napkins and a plurality of writing instruments. Writing instruments may comprise pens, pencils, markers, and the like. Pens are preferred, especially hybrid ball point and tip pens, because of ease use when writing on a surface of napkin ideas.

Preferably, a website URL and a QR code on the napkin is linked to a user-submission website which may conveniently be accessed via a mobile communication device. User-patrons may access the user-submission website of napkin idea systems via a downloadable mobile application. User-patrons may access the user-submission website of napkin idea systems by visiting a website URL via an internet browser. User-patrons may access the user-submission website of napkin idea systems by scanning a bar code or QR code provided on a surface of the cocktail napkins (and other accessories associated with napkin idea systems).

User-patrons may visit the user-submission website of napkin idea systems using a Smartphone, a tablet, a computer, a watch, or any other computer device with internet access.

The user-submission website may comprise user-submission form accessible via the user-submission website. As shown, the user-submission form may comprise a plurality of form fields and labels for the user-patron to input custom data. Form fields and labels may comprise: Inventor's Name; Title of Idea (if any); Primary E-mail; Phone Number; Describe Your Idea; and Upload Napkin Sketch of Attachment. A button may be accessible enabling the user-patron to upload a photo or scan of their napkin and other helpful files or information related to the idea of the submission.

Further, the user-submission form may comprise a confidentiality clause. The confidentiality clause may be modified or altered to suit the needs of its use. The confidentiality clause is intended to provide assurance to the user-patron that their submission will be treated in a confidential manner and will not be disclosed to third parties. The confidentiality clause also describes what constitutes as Confidential Information. The confidentially clause also describes how the confidential information is to be used by the third-party.

In one manner of use, the confidential information may be used by a patent service provider. In such a manner, the patent service provider welcomes new clients with ideas to explore patentability thereof. Many patent attorneys and patent groups do not charge to assess the general nature of an idea to initially determine whether the idea is generally patentable (notwithstanding further research into 'prior art' or other investigation). The general assessment would provide the client with options as to what parts of the original thought or idea may be patentable, or whether trademark or copyright protection is more appropriate.

In another manner of use, the confidential information may be used by a marketing or licensing company. In such a manner, the marketing or licensing company welcomes new clients with ideas to explore commercial strengths. Ideas with commercial strengths require marketing services which the marketing company may be able to solicit. Similarly, ideas with commercial strengths may present opportunities to professional licensing agents who have ties and connections with companies with wide distribution means. Businessmen in the fields of marketing and licensing may benefit from receiving new ideas and providing a free evaluation of the idea to explore new client relationships. Many times, marketing and licensing companies work hand in hand and collaborate with patent groups and patent firms to handle the protection side while they handle the marketing and licensing side.

Napkin idea systems may further a napkin and pen holder. The napkin and pen holder may comprise a frame, a napkin housing, and at least one writing instrument retaining aperture. The frame may comprise a stand for supporting the napkin housing and the writing instrument retaining aperture(s). The frame may further comprise a back display and a top display. The back display and the top display may be used for display use. Examples of display use may include, but are not limited to, instructions and disclaimers regarding use of Napkin Ideas, marketing and branding indicia, and the like.

It should be noted and appreciated that the napkin pen holder may also comprise a package. The package may comprise a pair of flaps which are foldable over the napkin housing. The flaps may be securely closed via tabs, fasteners, adhesives, and other closure means as known and understood by those familiar with the art. The flaps may securely enclose the napkins during periods of non-use. Further, the flaps may be securely closed and sealed for shipment.

The napkin pen holder may be fabricated of plastic, cardboard, or other non-ferrous materials. In other embodiments, the napkin pen holder may be metallic and fabricated from ferrous materials. The latter embodiment is a sturdier and more durable version. The former embodiment is best for shipping and disposal (recycling preferred) after extended use.

In other embodiments, the napkin pen holder may comprise at least one condiment-retainer attached to the frame. The condiment-retainer may comprise a larger through-hole as compared to the writing instrument retainer aperture such as to allow removable storage of a condiment bottle or container. Examples of condiment bottle(s) or container(s) include, but are not limited to, salt shakers, pepper shakers, ketchup bottles, mustard bottles, hot sauce bottles, soy sauce containers, steak sauce or marinade bottles, and the like.

It should be noted that the napkin and pen holder may be configured to accommodate up to four (4) writing instruments, and in other embodiments, the napkin and pen holder may be structured and arranged to accommodate greater or fewer writing instruments.

The napkin pen holder may further comprise hinge connectors for connecting together at least one board member to and at least one board member. In a preferred embodiment, the napkin pen holder may comprise three board members, two of which are hingeably attached for enabling folding of the board members. The middle board member may comprise a pair of large through-holes. The through-holes may function as both a napkin pen holder carrier. They also serve the use of retaining at least one condiment on the table. As shown, the board members may fold inside the napkin holder compartment during periods of non-use, and may fold outside and parallel to each side of the frame of the napkin pen holder. Each of the middle board members on both sides comprises a pair of condiment retainers for retaining up to 4 condiment containers (such as ketchup, mustard, salt, pepper, and the like).

A method of using napkin idea systems by a user-patron may comprise the steps of: removing a napkin from a napkin pen holder (or other location proximate to the user-patron); removing a writing instrument from the napkin pen holder (or elsewhere); scribbling an original thought on the napkin; accessing a submission form via a website and alternatively a mobile application via an internet-accessible communication device; and submitting the original thought via the submission form for third-party evaluation. A method of inducing business for a patent firm or the like may include obtaining the specialty napkins, delivering the napkins to a restaurant or pub, instructing the owner of the premises on proper use and collecting information via indicia (QR codes, alphanumeric text, logos or the like). In this way the present invention drives website traffic to the patent firm's website or the like. Business cards and other indicia may be used in conjunction with the napkins or the box to act in the form of an advertisement or other promotion means.

Referring to the drawings by numerals of reference there is shown in FIG. 1, a perspective view illustrating napkin 105 of napkin idea systems 100 during 'in-use' condition 150 showing user-patron 140 scribbling 120 on writeable surface 110 of napkin 105 according to an embodiment of the present invention. As shown, napkin idea system 100 may comprise napkin 105 having writeable surface 110, indicia 115 printed on napkin 105 and configured for inducing a user-patron 140 to scribble idea 120 on writeable surface 110 of napkin 105, and submittal-means 300 (shown in FIG. 3) configured to enable user-patron 140 to remotely submit idea 120 to third-party 302 for evaluation of idea 120.

It should be noted that napkin 105 of napkin idea systems 100 may take a variety of forms. In one embodiment, napkin 105 may comprise a cocktail napkin. The cocktail napkin may have a square profile. In another embodiment, napkin 105 may comprise a dining napkin. The dining napkin may comprise a rectangular profile. It should be appreciated that napkin 105 may take any shape or form. Further, while it is contemplated that napkin 105 is fabricated of paper or tissue stock, it should be noted that napkin 105 may be fabricated of cloth and may be washable and re-usable.

In a preferred embodiment, napkin 105 may comprise a 3-ply tissue napkin. The 3-play tissue napkin has a desired thickness which may enable optimal writing and drawing on writing surface 110 of napkin 105. However, it should be noted that napkin 105 may comprise 2-ply or 1-ply tissue napkins as well.

Figure 2A:
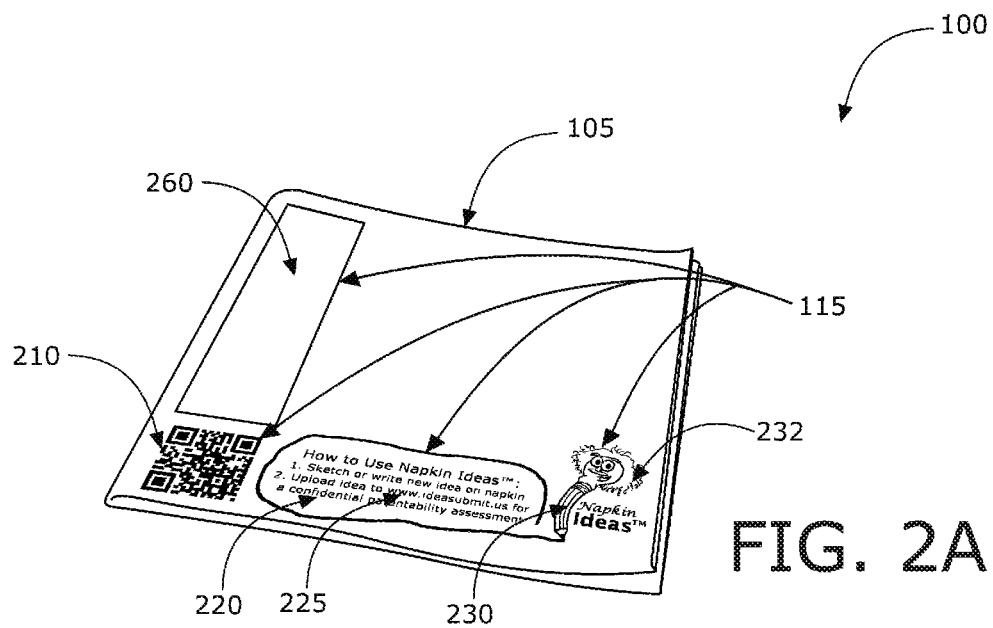
FIG. 2A is a perspective view illustrating the napkin of napkin idea systems in a folded condition comprising the writeable surface and indicia configured to induce the user-patron to scribble on the napkin according to an embodiment of the present invention of FIG. 1.
Figure 2B:
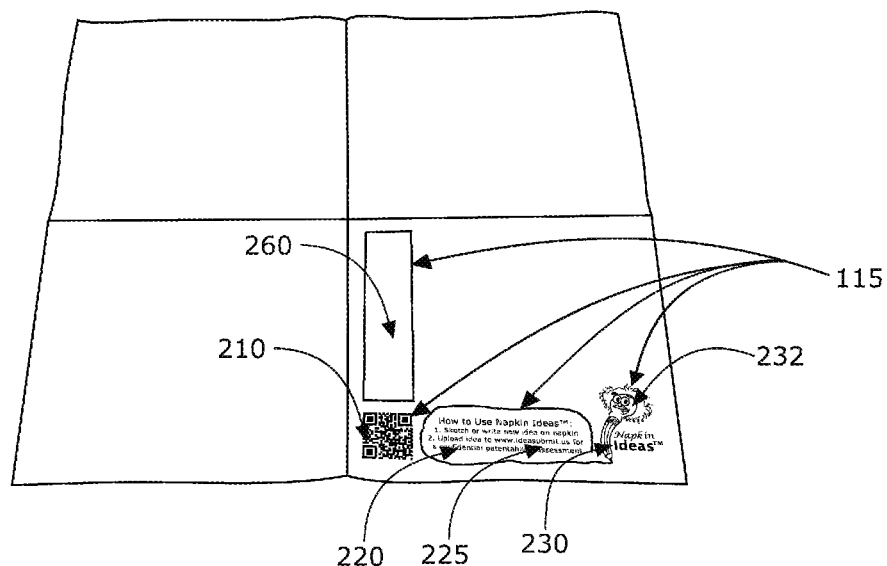
FIG. 2B is a perspective view illustrating the napkin of napkin idea systems in an unfolded condition according to an embodiment of the present invention of FIGS. 1 and 2A.

Referring now to FIG. 2A, showing a perspective view illustrating napkin 105 of napkin idea systems 100 in a folded condition according to an embodiment of the present invention of FIG. 1. Referring to FIG. 2B, showing a perspective view illustrating napkin 105 of napkin idea systems 100 in an unfolded condition. Napkin 105 is shown comprising indicia 115 on a top surface of napkin 105. Indicia 115 is preferably configured to induce user-patron 140 to scribble on napkin 105.

In one example, indicia 115 printed on napkin may comprise words 220 configured to invite user-patron 140 to scribble idea 120 on writeable surface 110 of napkin 105. Words 220 may comprise an inviting question, an inspirational quote, a factoid about famous inventions or inventors, a challenge, a joke, a quiz, and the like. Words 220 may be printed along the side-edges of napkin 105 such as to maintain clear open space for user-patron 140 to draw, scribble, write, and otherwise express idea 120.

In another example, indicia 115 printed on napkin 105 may comprise instructions 225 configured to explain how to submit idea 120 to third-party 302 for evaluation. Instructions 225 may be printed along the side-edges of napkin 105 such as to maintain clear open space for user-patron 140 to draw, scribble, write, and otherwise express idea 120. Instructions 225 may further include a website URL for submitting idea 120 to third-party 302 for evaluation.

In yet another example, indicia 115 may comprise graphical depiction(s) 230. One example of graphical depiction 230 may be a writing instrument designed to induce user-patron 140 to write or draw on writeable surface 110 of napkin 105. In one playful example, graphical depiction 230 may comprise a caricature of a pencil having characteristics of Albert Einstein. Other caricatures may be used bearing characteristics of other famous inventors. The intention of depicting a writing instrument is to symbolically or subliminally induce user-patron 140 to creatively draw, sketch, scribble, write, and otherwise express idea 120 on writeable surface 110 of napkin 105. Further, graphical depiction 230 are intended to provide entertainment to user-patron 140.

In another example, indicia 115 may comprise marketing indicia 115 designed to promote a sponsor of napkin 105. For instance, indicia 115 may comprise a logo of establishment 160 agreeing to host napkin 105 of napkin idea systems 100. In still another example, indicia 115 may comprise educational information or entertainment information designed to educate or entertain user-patron 140.

In one embodiment of napkin idea systems 100 as shown in FIGS. 2A and 2B, indicia 115 may comprise quick response barcode 210 (QR code) configured to navigate a website browser to website 305 via a scan function of mobile device 195.

Figure 3A:
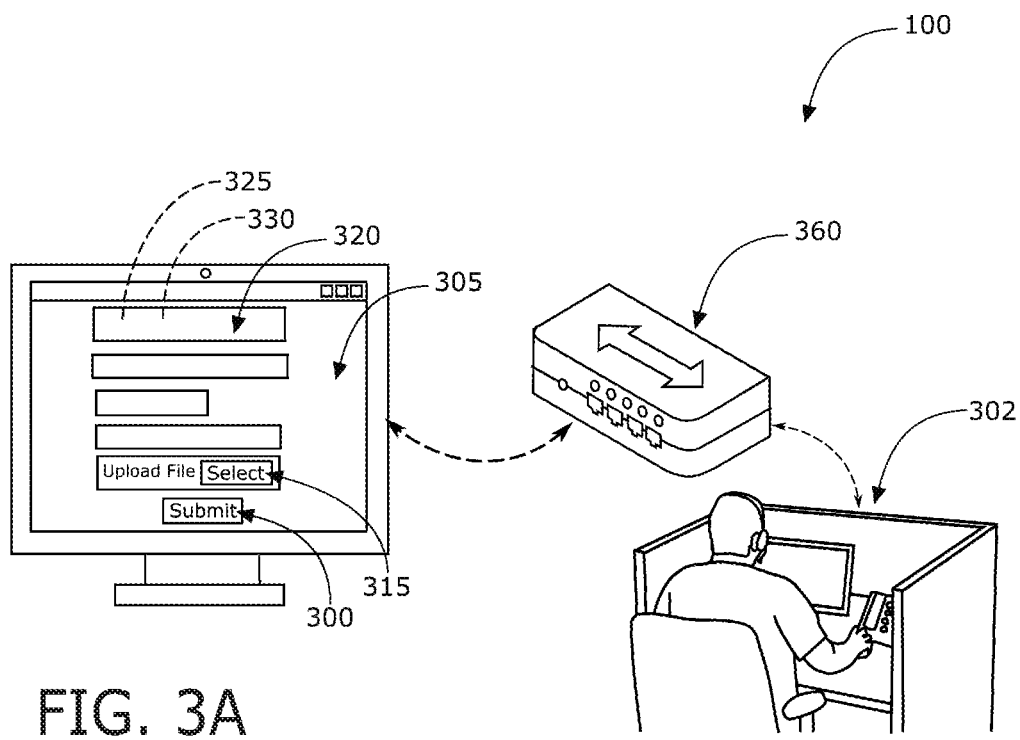
FIG. 3A is a perspective view illustrating submittal-means for submitting the idea via a website to a third-party for idea evaluation according to an embodiment of the present invention of FIGS. 1-2B.
Figure 3B:
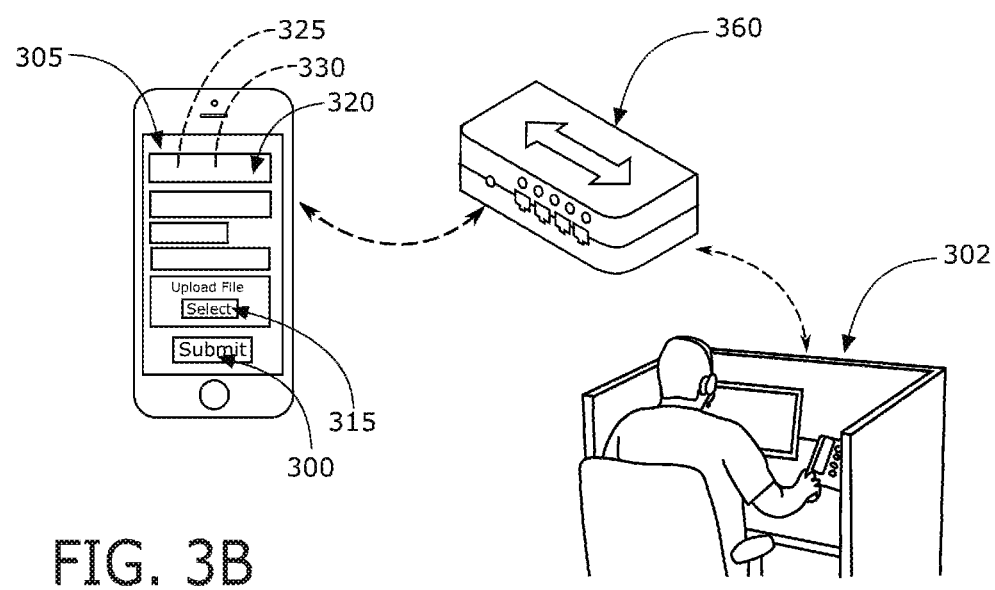
FIG. 3B is a perspective view illustrating submittal-means for submitting the idea via a downloadable mobile application to the third-party for idea evaluation according to an embodiment of the present invention of FIGS. 1-2B.

Referring now to FIGS. 3A and 3B showing a pair of perspective views illustrating submittal-means 300 for submitting idea 120 via website 305 or downloadable mobile application program 310 to third-party 302 for evaluation of idea 120 according to an embodiment of the present invention of FIGS. 1-2B.

In an embodiment of the present invention, submittal-means 300 is processed via website 305 hosted on server 360 and accessible via an internet-enabled communication device. As shown, website 305 preferably comprises file uploader 315 configured to enable user-patron 140 to submit digital image 198 of idea 120 captured by user-patron 140. In such a manner, user-patron 140 is able to take a photo of idea 120 on napkin 105 using mobile device 195 and submit digital image 198 of idea 120 via file uploader 315.

As further shown in FIG. 3A, website 305 may comprise plurality of form fields 320. Form fields 320 are configured to enable user-patron 140 to submit information-data 325 related to idea 120 to third-party 302. Information-data 325 may comprise questions related to idea 120, such as how does idea 120 work, describe components or parts of idea 120, what makes the idea 120 novel or different from other known inventions, how did user-patron 140 develop idea 120, how can idea 120 be built or assembled, how does idea 120 work, and the like.

Additionally, website 305 may comprise plurality of form fields 320 configured to enable user-patron 140 to submit biographic-data 330 related to user-patron 140. Biographic-data 330 may comprise identifying information related to user-patron 140, contact information related to user-patron 140, and the like.

It should further be noted that submittal-means 300 may comprise downloadable mobile application program 310 accessible via mobile device 195 as shown in FIG. 3B. Downloadable mobile application program 310 may comprise file uploader 315 configured to enable user-patron 140 to submit digital image 198 of idea 120 captured by user-patron 140 via mobile device 195. Further, downloadable mobile application program 310 may comprise plurality of form fields 320 configured to enable user-patron 140 to submit information-data 325 and biographic-data 330 to third-party 302 for evaluation of idea 120. Downloadable mobile application program 310 may comprise software code bundled into an executable program developed for mobile device 195 and downloadable from a mobile application program marketplace (also known as an 'app store'). Information submitted via downloadable mobile application program 310 may be processed by server 360 and delivered to third-party 302.

As may be appreciated, idea 120 may comprise a concept for a new invention. A new invention may take the form of a new product, a new mobile application, a new software program, a new method for accomplishing a useful function, or the like. Alternatively, idea 120 may comprise a concept for a new trademark or brand name, an original saying, a written expression, a trade secret, or other proprietary information.

It should be noted that third-party 302 that is in position to receive submissions of ideas 120 as generated by user-patrons 140 of napkin idea systems 100 may comprise a business in the field of invention promotion, product development, invention prototype development or programming. Alternatively, third-party 302 may comprise a business in the field of patent research, patent drafting or invention licensing.

Figure 4:
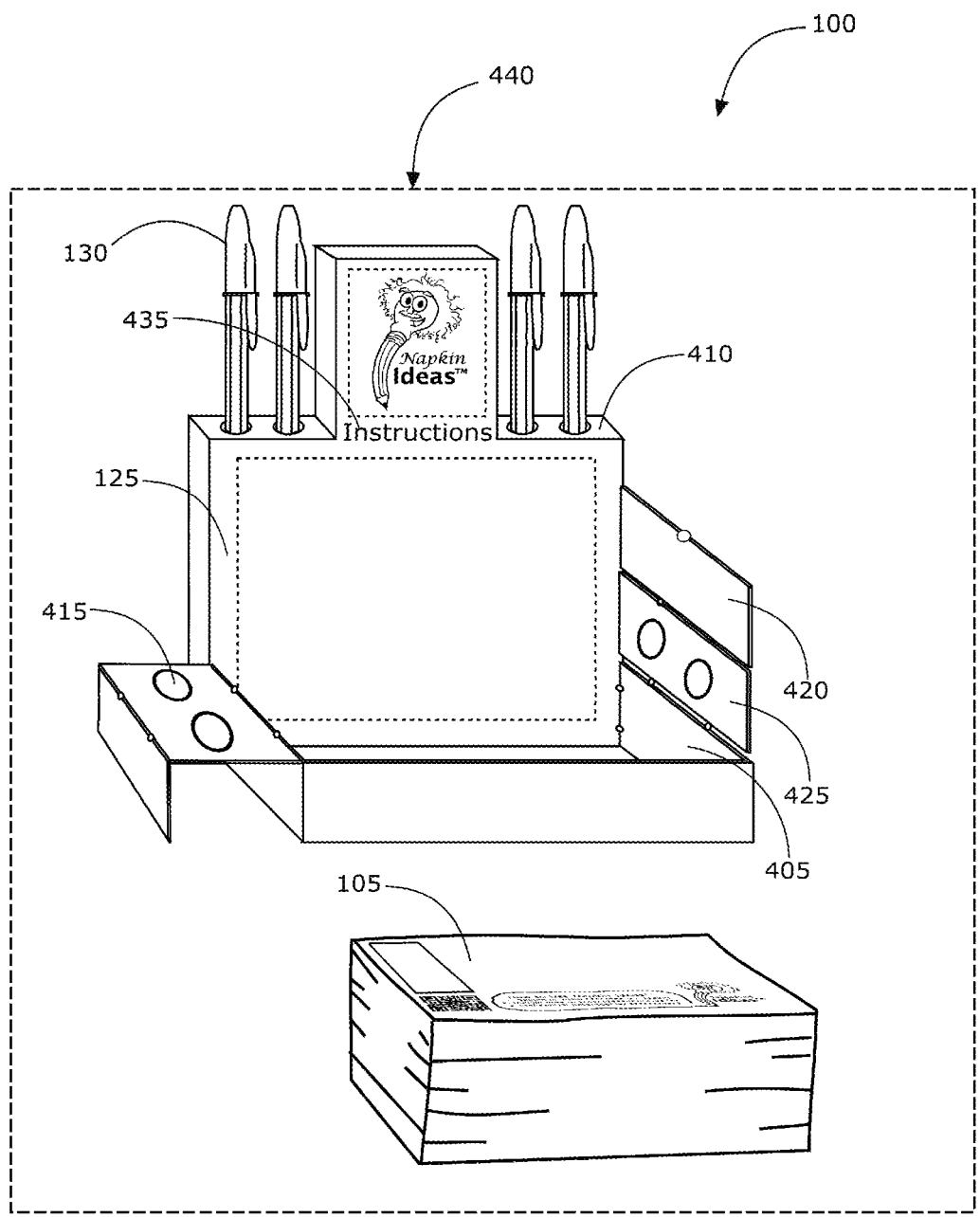
FIG. 4 is a perspective view illustrating a kit for napkin idea systems comprising a napkin holder, pens, and a stack of the napkins according to an embodiment of the present invention of FIGS. 1-3.

Referring now to FIG. 4, showing kit 440 of napkin idea system 100. As shown, napkin idea system 100 may be sold or distributed as kit 440 comprising the following parts: stock of napkins 105 having writeable surface 110 and indicia 115 printed on napkins 105 configured for inducing a user-patron 140 to scribble an idea 120 on writeable surface 110 of napkin 105; at least one pen 185 optimized for writing on writeable surface 110 of napkin 105; and at least one napkin holder 125.

In continuing to refer to FIG. 4, napkin holder 125 may essentially comprise napkin compartment 405 for retaining napkins 105, at least one pen holder 410, at least one condiment holder 415 configured for retaining a table condiment (ie. salt, pepper, ketchup, etc.), first panel 420, second panel 425, closing means 430 for securing first panel 420 to second panel, and holder-instructions 435 for using napkin idea system 100 for promoting inventive concepts.

Napkin idea systems 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
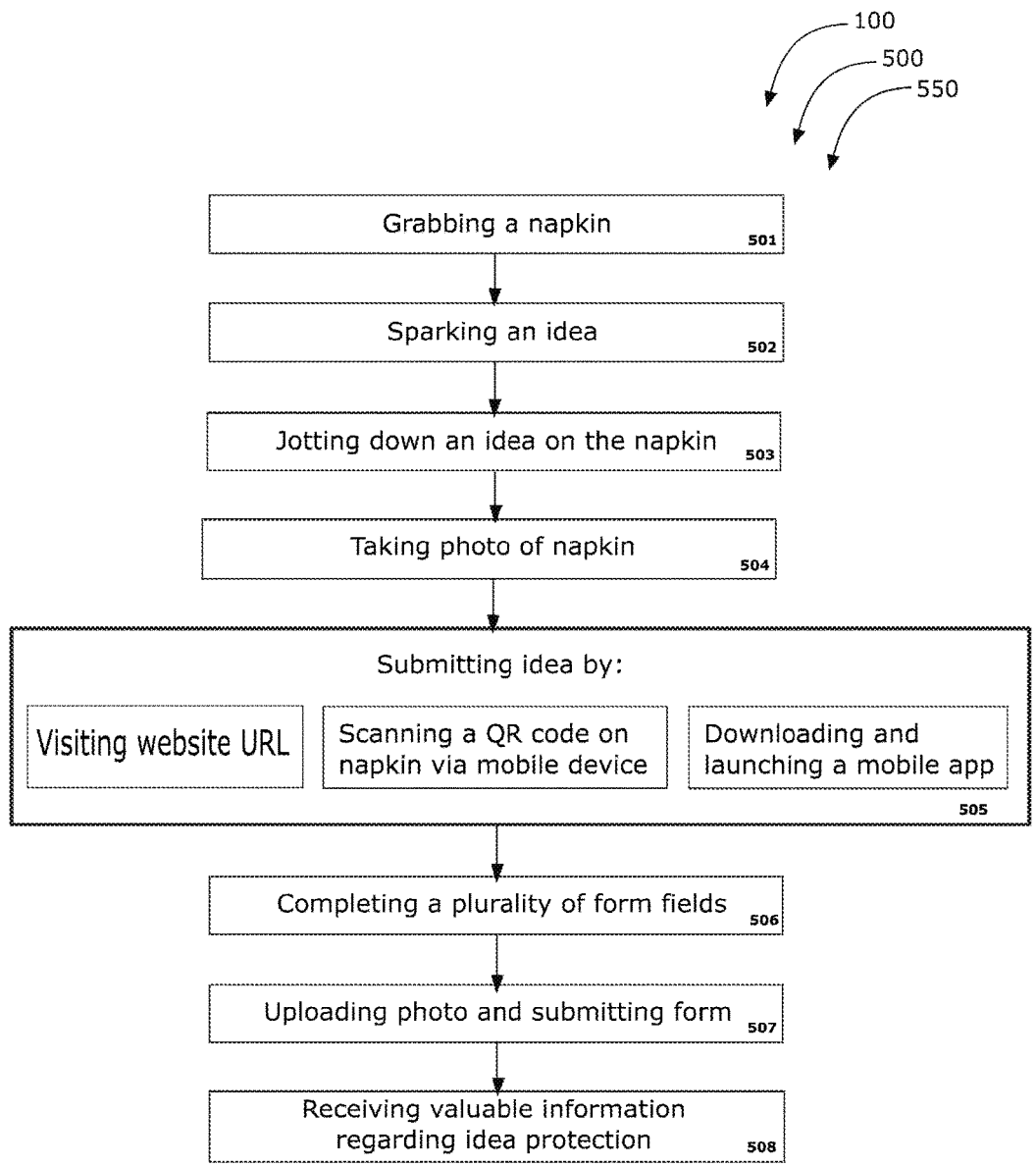
FIG. 5 is a method of use by the user-patron of napkin idea systems according to an embodiment of the present invention.

Referring now to FIG. 5 showing flowchart 550 illustrating method of use 500 by user-patron 140 of napkin idea systems 100 according to an embodiment of the present invention. As shown, method of use 500 by user-patron 140 may comprise the steps of: step one 501, grabbing napkin 105; step two 502, sparking idea 120; step three 503, jotting down idea 120 on writeable surface 110 of napkin 105; step four 504, submitting idea 120 by taking digital image 198 (photo) of idea 120 and visiting website 305 or opening mobile application program 310; step five 505, acknowledging confidentiality clause; step six 506, uploading digital image 198 of idea 120 via file uploader 315 and completing plurality of form fields 320; and step seven 507, receiving valuable information regarding protection of idea 120.

Figure 6:
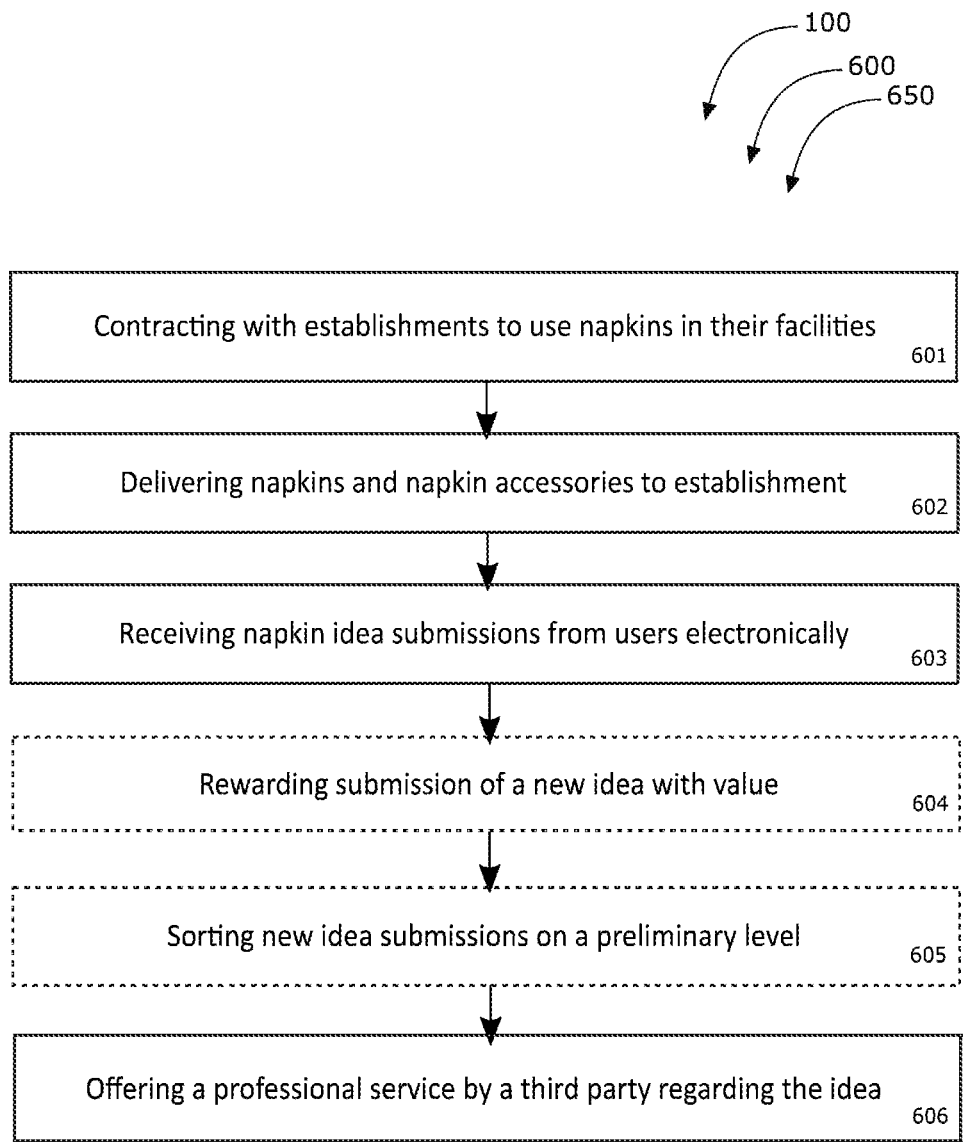
FIG. 6 is a business method of use by the third-party of napkin idea systems according to an embodiment of the present invention.

Referring now to FIG. 6 showing business flow diagram 650 illustrating business method of use 600 by third-party 302 of napkin idea systems 100 according to an embodiment of the present invention. Business method of use 600 by third-party 302 in the business of working with inventive concepts may comprise the steps of: step one 601, contracting with at least one public establishment 160 to supply a stock of napkins 105 having writeable surface 110 and indicia 115 printed on napkin 105 configured for inducing user-patron 140 to scribble idea 120 on writeable surface 110 of napkin 105; step two 602, delivering stock of napkins 105 and optionally delivering accompanying napkin accessories to at least one public establishment 160; step three 603, receiving napkin idea submission(s) by third-party 302 from user-patron(s) 140 electronically via at least one submittal-means 300; and step six 606, offering a professional service to user-patron(s) regarding napkin idea submission(s).

Optional steps may include: step four 604, rewarding user-patron 140 for submitting idea 120; and step five 605, sorting idea(s) 120 on a preliminary level prior to contacting user-patron 140. It should be noted that steps four and five are optional steps and may not be implemented in all cases. Optional steps of business method of use 600 are illustrated using dotted lines in FIG. 6 so as to distinguish them from the other steps of business method of use 600.

Professional services third-party 302 may offer user-patron 140 may include, but not limited to, patentability assessment, intellectual property protection, marketability assessment, commercial viability assessment, prototype development, program development, or licensing assistance of intellectual property.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for promoting innovation by a user, the system comprising:
    a submittal-means including a server communicably coupled to a user interface via an Internet connection, said submittal-means configured to enable the user to remotely submit an idea description to a remote third-party via said user interface;
    a napkin having a writeable surface;
    a first indicia printed on the napkin, said indicia including directions for the user to describe an idea on the writeable surface of the napkin as the idea description, said idea being one of an invention and a business idea;
    a second indicia printed on the napkin, said second indicia including instructions for the user to communicate the idea description to the remote third-party via the submittal-means; and
    a confidentiality statement printed on the napkin, said confidentiality statement agreeing that the remote third-party will maintain the idea description communicated via the submittal-means as confidential.

2. The system of claim 1, wherein the submittal-means further includes a website hosted on the server and accessible via the Internet connection.

3. The system of claim 2 wherein the website includes a file uploader configured to enable the user to submit a digital image of the idea captured by said user.

4. The system of claim 3 wherein the website further includes a first plurality of form fields configured to enable the user to submit information-data related to the idea.

5. The system of claim 4 wherein the website further includes a second plurality of form fields configured to enable the user to submit biographic-data related to said user.

6. The system of claim 5 wherein the second indicia includes a matrix barcode configured to navigate a website browser to the website hosted on the server via a scan function of a mobile device.

7. The system of claim 6, further comprising a third indicia printed on the napkin, said third indicia including a caricature of a pencil having characteristics of a famous inventor.

8. The system of claim 7 wherein said napkin is one of a cocktail napkin and a 3-ply tissue napkin.

9. The system of claim 7, further comprising a fourth indicia printed on the napkin, said fourth indicia including promotional or marketing information.

10. The system of claim 1, wherein the remote third-party is a business in the field of at least one of invention promotion, invention prototype development, patent research and patent preparation.

11. The system of claim 1, wherein the first indicia further includes educational information and alternatively entertainment information configured to educate and alternatively entertain said user.

12. The system of claim 1, wherein the user interface includes a mobile device, and the submittal-means further includes a downloadable mobile application program accessible via said mobile device, said downloadable mobile application program including a file uploader configured to enable the user to submit a digital image of the idea description as captured by said user, said downloadable mobile application program further including a plurality of form fields configured to enable said user to submit information-data to the remote third-party.

13. A napkin idea system for promoting inventive concepts-comprising:
   a napkin having a writeable surface;
   indicia printed on said napkin, said indicia comprising words and alternatively at least one graphical depiction, said indicia configured for inducing a user to scribble an idea on said writeable surface of said napkin; and
   a submittal-means configured to enable said user to remotely submit said idea to a third-party, said idea comprising a concept for a new invention;
   a kit including:
      a plurality of said napkins having said writeable surface and indicia printed on said napkin configured for inducing a user to scribble an idea on said writeable surface of said napkin;
      at least one pen optimized for writing on said writeable surface of said napkin; and
      at least one napkin holder, said napkin holder comprising: a napkin compartment;
      at least one pen holder;
      at least one condiment holder;
      a first panel; a second panel;
      a closing means for securing said first panel to said second panel; and
      instructions for using said napkin idea system for promoting inventive concepts
   wherein said submittal-means is transmittable via a website hosted on a server and accessible via an Internet connection and alternatively a downloadable mobile application program accessible via a mobile device;
   wherein said website and alternatively said downloadable mobile application program comprises a file uploader configured to enable said user to submit a digital image of said idea captured by said user;
   wherein said website and alternatively said downloadable mobile application program further comprises a plurality of form fields configured to enable said user to submit data; and
   wherein said third-party is able to receive said idea for purposes of evaluating said concept for said new invention.

14. A method for communicating an innovation by a user, the method comprising the steps of:
   providing a system for promoting innovation by the user, the system including
      a submittal-means including a server communicably coupled to a user interface via an Internet connection, said submittal-means configured to enable the user to remotely submit an idea description to a remote third-party via said user interface,
      a napkin having a writeable surface,
      a first indicia printed on the napkin, said indicia including directions for the user to describe an idea on the writeable surface of the napkin as the idea description, said idea being one of an invention and a business idea,
      a second indicia printed on the napkin, said second indicia including instructions for the user to communicate the idea description to the remote third-party via the submittal-means, and
      a confidentiality statement printed on the napkin, said confidentiality statement agreeing that the remote third-party will maintain the idea description communicated via the submittal-means as confidential;
   writing the idea on the writeable surface of the napkin as the idea description; and
   communicating the idea description to the remote third-party via the submittal-means.

15. The method of claim 14, wherein the user interface includes an internet-enabled mobile device having a digital camera, the method further comprising the step of capturing a digital image of the idea description written on the writeable surface of the napkin with the mobile device; and
   wherein the communicating the idea description to the remote third-party via the submittal-means includes uploading the captured digital image via a file uploader.

16. The method of claim 15, further comprising the steps of:
   electronically receiving the idea description from the user via the submittal-means, by the remote third-party;
   evaluating the idea description from the user, by the remote third-party;
   returning feedback electronically associated with the idea description to the user, by the remote third-party; and
   wherein the providing the system for promoting innovation by the user further includes providing a kit including a plurality of the napkins, a napkin holder configured to hold said plurality of the napkins, a pen configured to write on the writable surface of each napkin, a pen holder configured to hold said pen, and instructions for using said the system for promoting innovation; and wherein the communicating the idea description to the remote third-party via the submittal-means includes scanning a matrix barcode with a mobile device.

\* \* \* \* \*